(12) United States Patent
Kitagawa

(10) Patent No.: US 6,371,511 B1
(45) Date of Patent: Apr. 16, 2002

(54) SHOCK ABSORBING STRUCTURE FOR VEHICLE

(75) Inventor: Yuichi Kitagawa, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/471,413

(22) Filed: Dec. 23, 1999

(30) Foreign Application Priority Data

Dec. 25, 1998 (JP) .............................. 10-371302

(51) Int. Cl.⁷ .............................................. B60R 21/22
(52) U.S. Cl. .................................. 280/730.1; 280/743.1
(58) Field of Search ........................ 280/730.1, 743.1, 280/753, 735, 732; 297/216.1; 180/273

(56) References Cited

U.S. PATENT DOCUMENTS

| | | | |
|---|---|---|---|
| 5,161,820 A | * | 11/1992 | Vollmer ...................... 280/730 |
| 5,695,242 A | * | 12/1997 | Brantman et al. ........ 297/216.1 |
| 6,158,766 A | * | 12/2000 | Kowalski .................. 280/730.1 |
| 6,193,272 B1 | * | 2/2001 | Aigner et al. ............. 280/730.1 |

FOREIGN PATENT DOCUMENTS

| | | | | |
|---|---|---|---|---|
| GB | 2315713 A | * | 11/1998 | ........... B60R/21/06 |
| JP | 8-164782 | | 6/1996 | |
| JP | 10-305740 | | 11/1998 | |
| JP | 10-310011 | | 11/1998 | |
| JP | 11-20533 | | 1/1999 | |
| JP | 11-208348 | | 8/1999 | |

\* cited by examiner

*Primary Examiner*—Lanna Mai
*Assistant Examiner*—Christopher Buchanan
(74) *Attorney, Agent, or Firm*—McDermott, Will & Emery

(57) ABSTRACT

A shock absorbing structure for a vehicle is provided for moderating an impact on a passenger's foot due to the deformation of a foot panel 105. A bag 104 is arranged adjacent to the foot panel 105. When the foot panel 105 is deformed due to the vehicle's collision or the like, the bag 104 is expanded to moderate the impact on the passenger's foot.

17 Claims, 10 Drawing Sheets

SHOCK ABSORBING STRUCTURE FOR VEHICLE

BACKGROUND OF THE INVENTION

1. Field of the Invention

The present invention relates to a shock absorbing structure for a vehicle.

2. Description of the Invention

In general, when the vehicle collides through its front side, its body frames are supported to deform by absorbing crash energy. Such crushing of the vehicle body is sometimes accompanied with a backward deformation of a foot panel under the front passenger's foot (or feet). The magnitude of deformation depends on the crash severity. Therefore, there is a structure for absorbing the shock to the foot (or feet) during a high-speed crash in Japanese Patent Publication No. 8-164782. In the shock absorbing structure of this kind, a foot rest for placing the passenger's foot is made of material which is greatly compressible back and forth by the shock. Thus, at the vehicle collision, this foot rest is deformed so as to absorb an impact on the passenger's foot back.

However, since the above-mentioned shock absorbing structure is constructed so as to absorb the impact within the limits of thickness of a structure body constituting the foot rest, there is a limit in its shock absorbing ability. Therefore, if the foot panel is excessively deformed at the vehicle's collision, there is a possibility of insufficient absorption of impact with the result of the limit of deformation in the foot rest.

SUMMARY OF THE INVENTION

Under such a circumstance, it is an object of the present invention to provide an automotive shock absorbing structure for a vehicle, which is capable of sufficiently absorbing an impact on the passenger's foot (or feet) due to the deformation of the foot panel.

According to the invention, the above-mentioned object is accomplished by a shock absorbing structure for a vehicle, comprising:

a foot panel arranged in the vicinity of a foot of a passenger seating on a front seat of the vehicle, the foot panel forming a part of vehicled body;

a bag arranged adjacent to the foot panel;

a transmitter for transmitting a signal corresponding to a deformation of the dash panel;

wherein the bag expands, toward said foot of said passenger, corresponding to said signal to moderate an impact on the foot.

DESCRIPTION OF THE PREFERRED EMBODIMENT

Referring to the attached drawings, we now describe preferable embodiments of the present invention.

FIGS. 1A to 4 show the first embodiment of the present invention. In this embodiment, a vehicle has a front compartment F including an engine E and a cabin C for a passenger P, and they are separated by a dash panel. A vehicle body deformation sensor 101 is arranged in the vicinity of a foot panel (dash panel) 105 for a passenger on an automotive front seat. Further, a controller 102 is arranged in either a vehicle's position apart from the deformation applied on the vehicle body at the vehicle's collision or a vehicle's position being surrounded by a solid frame such as side members. The foot panel 105 is provided with an inflator 103 and a bag 104 which is expandable by gas in the inflator 103. Note, owing to its gaseous-expandable structure, a known air-bag structure is available for the bag 104. The bag 104 is made of flexible material. The bag 104 is shrunk and disposed on the foot panel 105. Accordingly, there is no need to fold the bag 104. Note, reference numeral 106 designates a brake pedal, a clutch pedal, an accelerating pedal or the like.

We now describe the operation of the structure. At the vehicle's collision, the body deformation sensor 101 detects a deformation amount of the foot panel 105 for the frontal passenger. The deformation sensor 101 is used a conventional acceleration sensor for detecting a vehicle collision, which calculates the foot panel deformation from double integration of the sensor signal, or a potentiometer for detecting the length of a wire linked with the foot panel 105. The information about deformation obtained by the deformation sensor 101 is fed to the controller 102 to calculate the amount of gas to be ejected into the bag 104. When the deformation of the foot panel 105 is small, the amount of ejected gas is reduced, while it is increased when the deformation is large. The information about ejection determined by the controller 102 is fed to the inflator 103, so that a prescribed amount of gas is ejected to the bag 104. The bag 104 having gas ejected does swell at the passenger's foot (feet). Although the foot panel 105 moves back to the back of the passenger's foot (i.e. foot back) with the progress of deformation of the vehicle's body after the collision, the swollen bag 104 serves to absorb the impact on the foot back (cf. FIG. 1B).

Figure 1A:
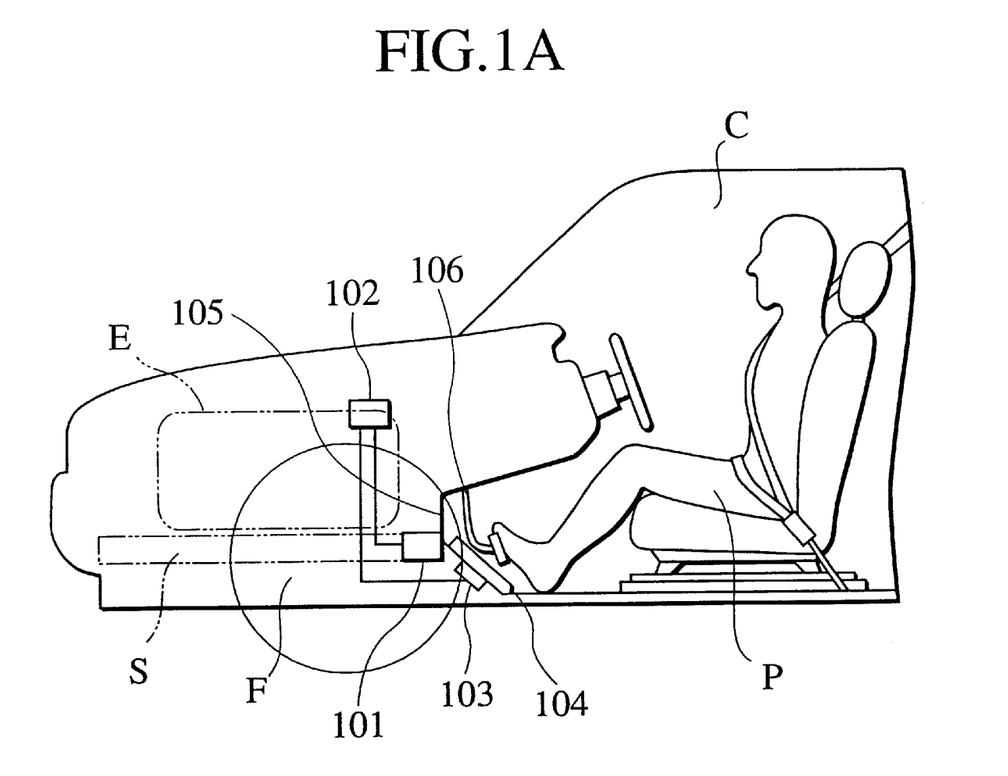
FIG. 1A is a sectional view of an automotive front section in accordance with the first embodiment of the present invention.
Figure 1B:
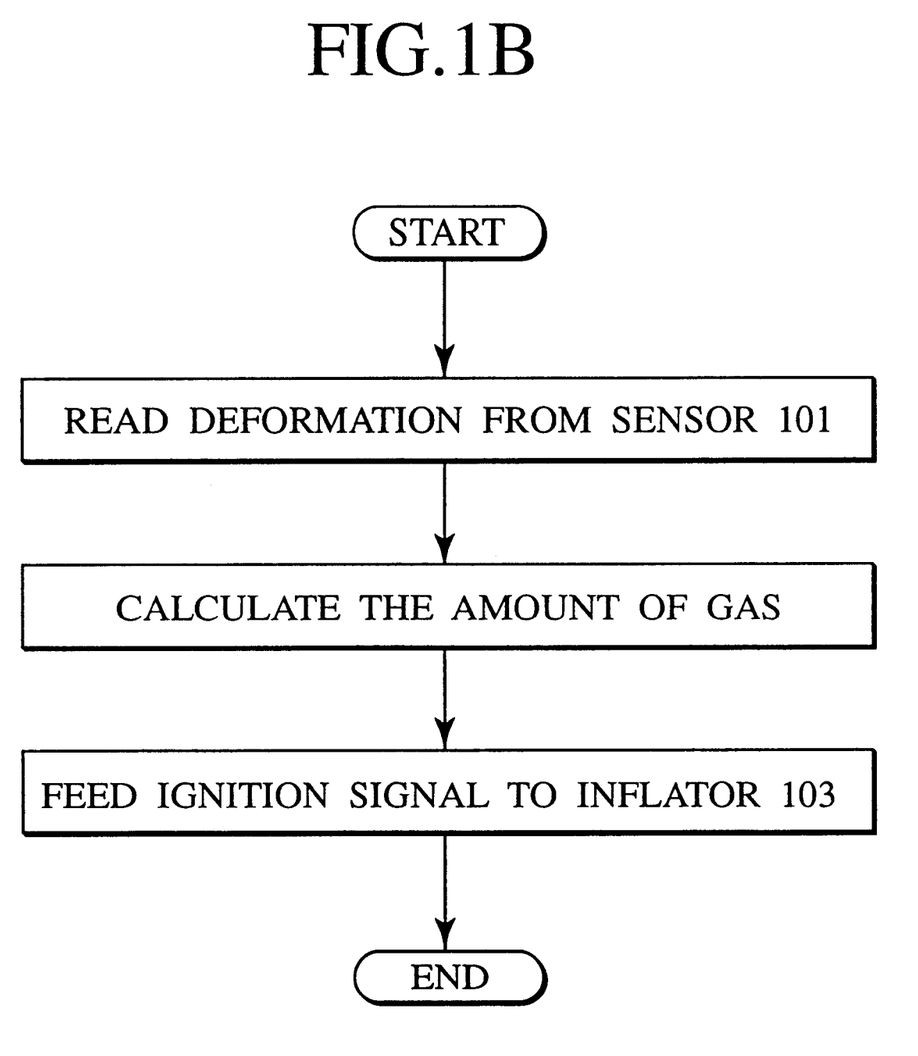
FIG. 1B is a flow chart showing a control in the first embodiment of the present invention.
Figure 2:
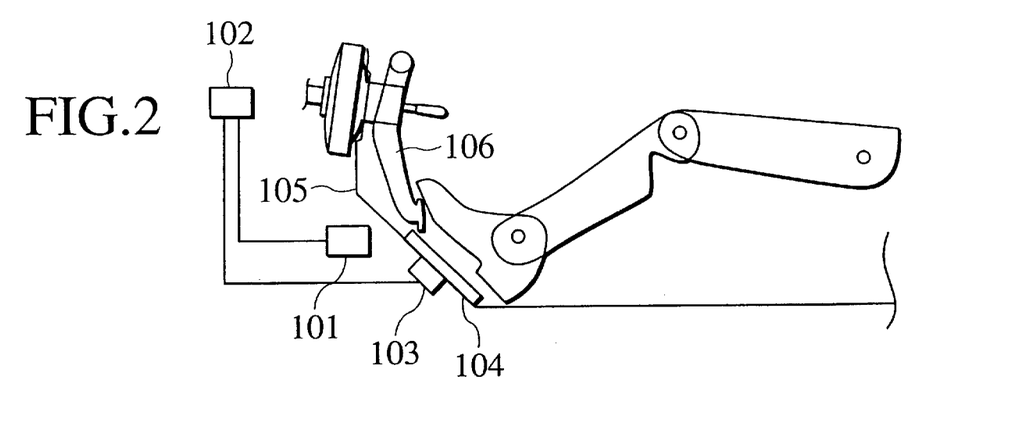
FIG. 2 is a sectional view showing a foot panel before deformation in accordance with the first embodiment of the present invention.
Figure 3:
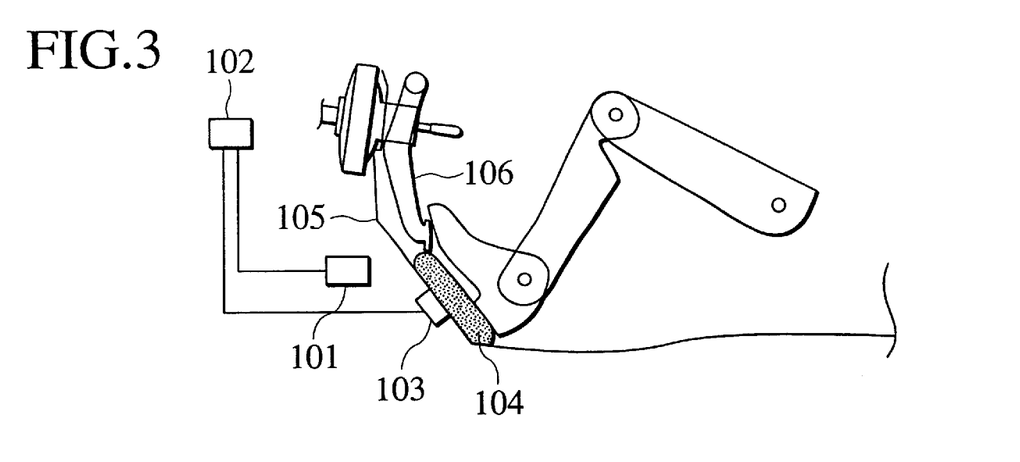
FIG. 3 is a sectional view showing the foot panel being deformed a little in accordance with the first embodiment of the present invention.
Figure 4:
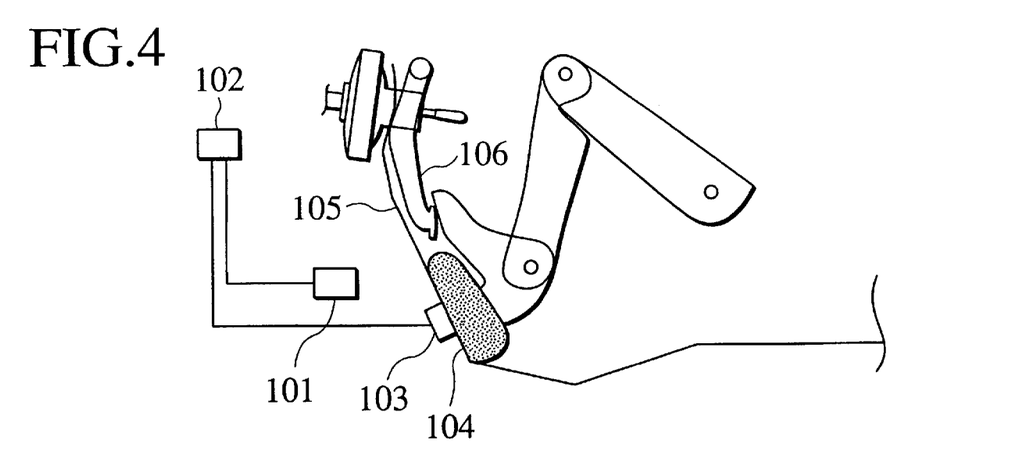
FIG. 4 is a sectional view showing the foot panel being deformed large in accordance with the first embodiment of the present invention.

FIG. 2 shows a situation where the frontal passenger is stepping on a pedal 106. In this state, the foot panel 105 is in the form of the beginning condition that the bag 104 has nothing in it. FIG. 3 shows a state just after the vehicle's collision where the deformation of the foot panel 105 is small. As mentioned above, in case of small deformation of the foot panel 105, the controller 102 operates in a manner that the amount of ejected gas supplied from the inflator 103 to the bag 104 becomes small. However, due to small impact from the collision, it is possible to sufficiently absorb the impact on the foot back in spite of the small rate of expansion. FIG. 4 shows a state after the vehicle's collision where the deformation of the foot panel 105 is large. It is supposed that the large deformation of the foot panel 105 causes the impact on the foot back to be increased. According to the invention, however, since the large deformation of the foot panel. 105 is detected to increase the rate of expansion of the bag 104, it is also possible to absorb the impact on the foot back sufficiently.

In this way, since the amount of expansion of the bag 104 gets larger corresponding to the amount of deformation of the foot panel 105, it is possible to absorb and moderate the impact on the passenger's foot irrespective of the amount of deformation of the foot panel 105. Additionally, since the deformation sensor 101 detects the amount of deformation of the foot panel 105, it is possible to control the amount of expansion of the bag 104 precisely. As the expanded bag 104 is disposed between the foot panel 105 and the pedal 106, the passenger's foot stepping on the pedal 106 can be certainly protected in case of the passenger's stepping on the pedal 106 at the vehicle's collision. Furthermore, owing to the structure capable of expanding the bag 104 by gas, a design for widely covering the space at the passenger's feet would allow the passenger's left and right feet to be simultaneously protected from the impact irrespective of the position of the feet at the vehicle's collision.

Figure 5:
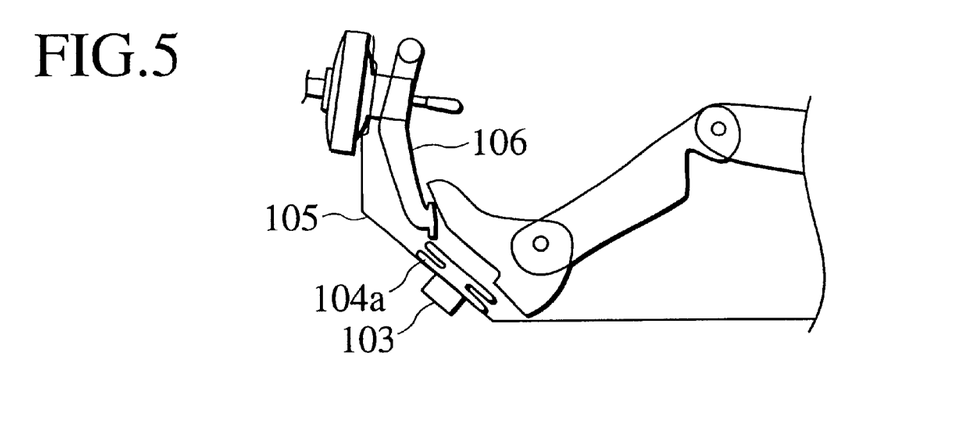
FIG. 5 is a sectional view showing the foot panel before deformation in accordance with the second embodiment of the present invention.
Figure 6:
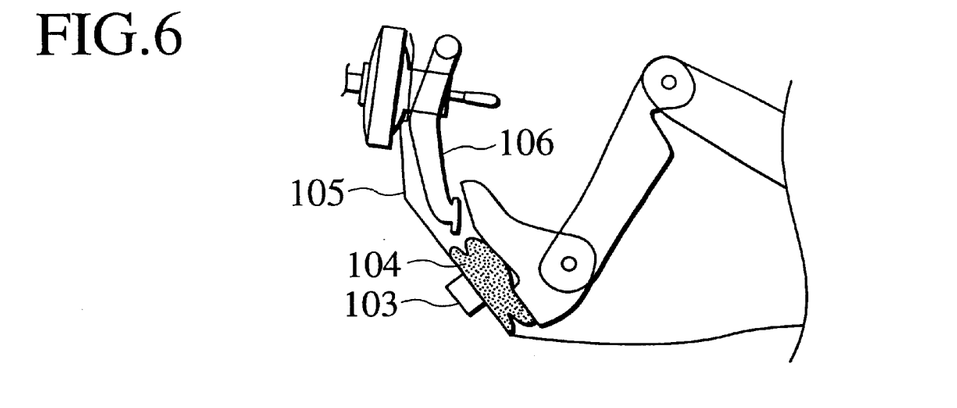
FIG. 6 is a sectional view showing the foot panel being deformed a little in accordance with the second embodiment of the present invention.
Figure 7:
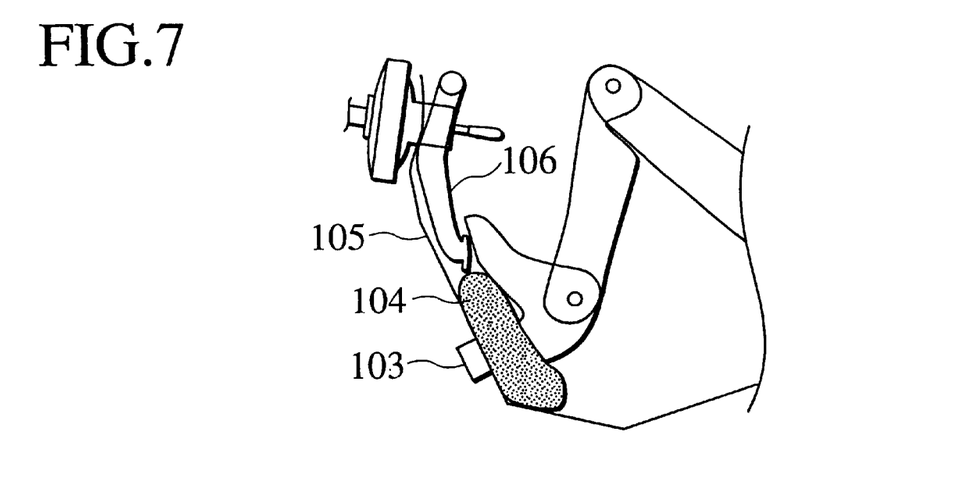
FIG. 7 is a sectional view showing the foot panel being deformed large in accordance with the second embodiment of the present invention.

FIGS. 5–7 show the second embodiment of the invention. A bag 104*a* is made of non-expandable material and arranged on the foot panel 105 while the bag 104 is being folded. Similarly to the first embodiment, the bag 104*a* of the embodiment is also constructed so as to expand by the detection of the deformed foot panel 105 at the vehicle's collision. Besides, different from the above-mentioned bag 104 which is expandable by its own elongation, the bag 104*a* allows the volume to be increased by its unfolding operation from the folded condition. Accordingly, the expansion of the bag 104*a* is fixed in its direction.

FIG. 5 shows a situation where the frontal passenger is stepping on the pedal 106. FIG. 6 shows a state just after the vehicle's collision where the deformation of the foot panel 105 is small. FIG. 7 shows a state after the vehicle's collision where the deformation of the foot panel 105 is large. In case of small deformation of the foot panel 105, the amount of ejected gas supplied from the inflator 103 to the bag 104*a* is reduced to make its inflating volume small. On the contrary, in case of large deformation of the foot panel 105, the amount of ejected gas is increased to make the inflating volume large. Therefore, irrespective of the amount of deformation of the foot panel 105, it is possible to moderate the impact on the passenger's foot back.

Figure 8:
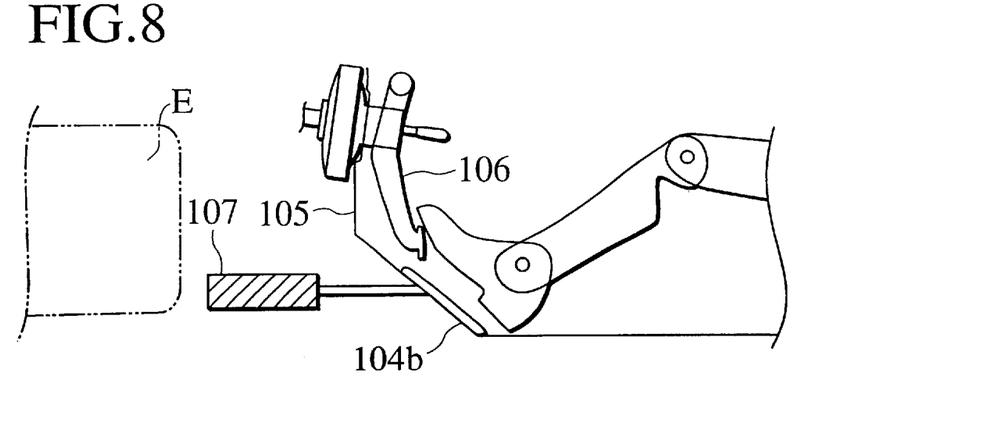
FIG. 8 is a sectional view showing the foot panel before deformation in accordance with the third embodiment of the present invention.
Figure 9:
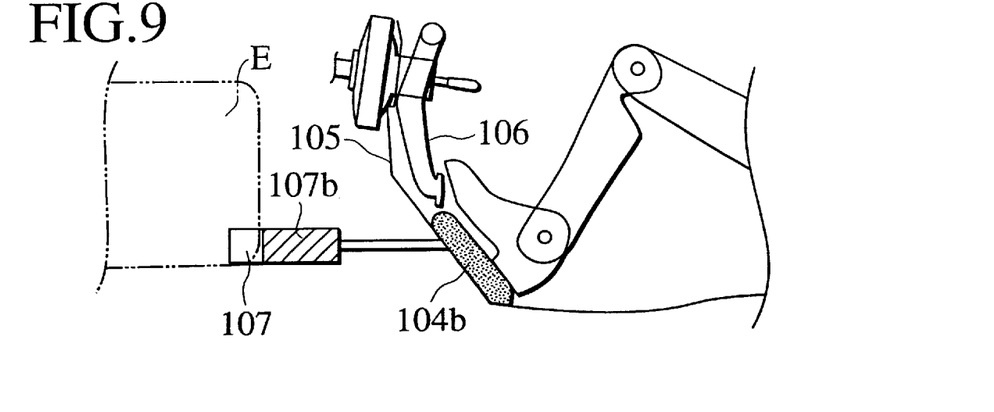
FIG. 9 is a sectional view showing the foot panel being deformed a little in accordance with the third embodiment of the present invention.
Figure 10:
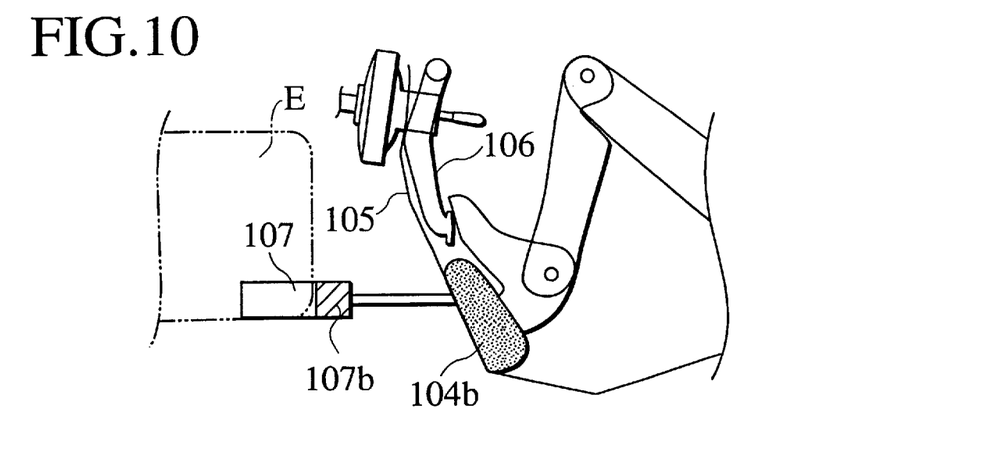
FIG. 10 is a sectional view showing the foot panel being deformed large in accordance with the third embodiment of the present invention.

FIGS. 8–10 show the third embodiment of the present invention. A reservoir tank 107 is arranged in an engine room of the vehicle's front section. The interior of the reservoir tank 107 (cylinder) is filled up with liquid and constructed so as to be pressurized through a piston 107*a*. The reservoir tank 107 is arranged in the vicinity of the foot panel 105 so that the operating direction of the piston 107*a* generally coincides with the back and forth directions of the vehicle. In view of the effective use of space in the vehicle body, the reservoir tank 107 is positioned in a vacant space on the dark side of the foot panel 105. The piston 107*a* in the reservoir tank 107 has a front end (on the vehicle's front side) directed to a mass (or automotive member) which retreats toward the foot panel 105 at the vehicle's collision, for example, an engine block E, a transmission, a suspension frame, or the like. The tank's portion filled up with the liquid is connected with a bag 104*b* separated from the reservoir tank 107, through the intermediary of a pipe 107*b*. According to the embodiment, since the bag 104*b* is constructed to be expandable by the liquid, the shock absorbing structure is simple in comparison with that to be expanded by gas.

FIG. 8 shows a situation where the frontal passenger is stepping on the pedal 106. FIG. 9 shows a state just after the vehicle's collision where the deformation of the foot panel 105 is small. When the front section of the vehicle is deformed at the collision, the mass in the engine room (for example, an engine) relatively retreats to rearward of the vehicle. The rearward-urged mass presses the front end of the piston 107*a* to apply pressure on the liquid in the reservoir tank 107. The so-compressed liquid is supplied through the pipe 107*b* into the bag 104*b* for its expansion. FIG. 10 shows a state after the vehicle's collision where the deformation of the foot panel 105 is large. Thus, the rate of expansion of the bag 104*b* is controlled corresponding to the amount of deformation of the vicinity of the foot panel 105. In case of large deformation of the foot panel 105, the displacement of the piston 107 is increased with a large retreat of the mass in the engine room, so that the amount of injected liquid does increase. Consequently, the amount of expansion of the bag 104*b* is enlarged accordingly. In this way, the reservoir tank 107 of the embodiment serves as "deformation sensor", "controller" and "inflator" of the previous embodiment, all in one. Additionally, since the liquid is injected into the bag 104b owing to the impact at the vehicle's collision, there is no need to provide a pump for injecting the liquid. Therefore, it is possible to reduce the manufacturing cost of the structure.

Figure 11:
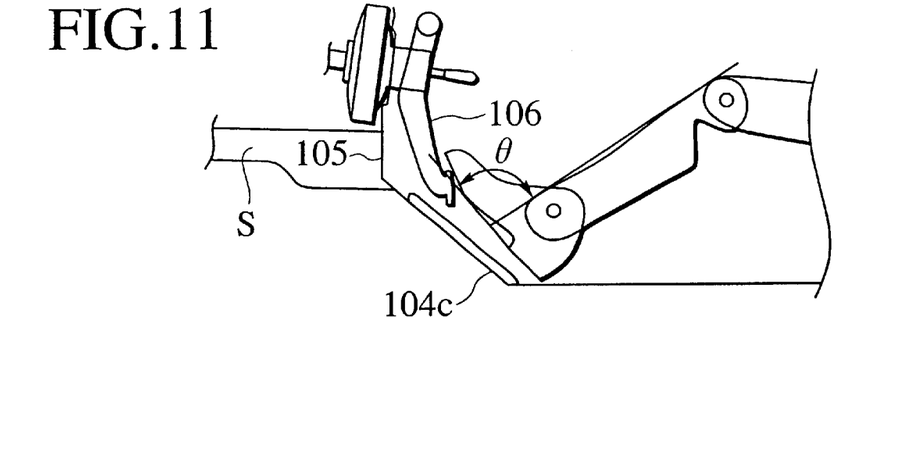
FIG. 11 is a sectional view showing the foot panel before deformation in accordance with the fourth embodiment of the present invention.
Figure 12:
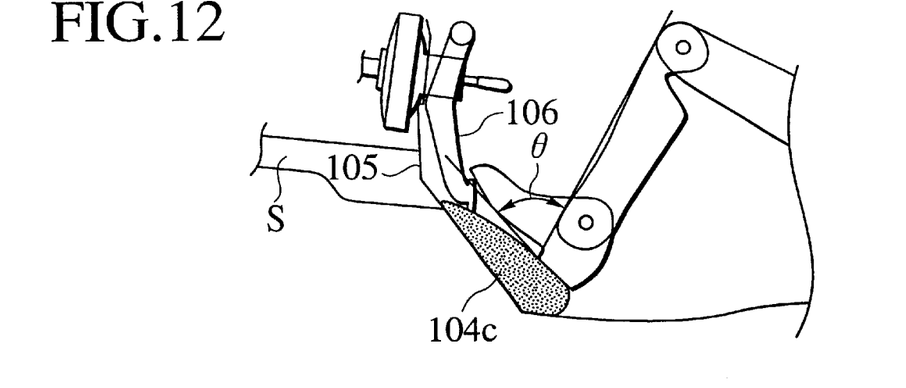
FIG. 12 is a sectional view showing the foot panel being deformed a little in accordance with the fourth embodiment of the present invention.
Figure 13:
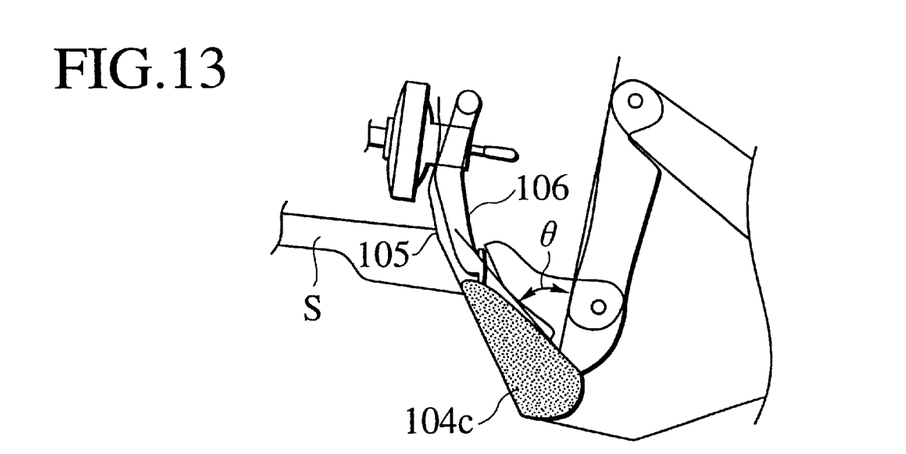
FIG. 13 is a sectional view showing the foot panel being deformed large in accordance with the fourth embodiment of the present invention.

FIGS. 11–13 show the fourth embodiment of the present invention. The essential constitution of the embodiment is similar to that of the second embodiment. Also in the operation, the former is similar to the latter in respect that a bag 104c is inflated corresponding to the amount of deformation of the foot panel 105. This embodiment is characterized by the bag 104c swelling largely on its portion close to the passenger's heel rather than another portion close to the passenger's toe.

FIG. 11 shows a situation where the frontal passenger is stepping on the pedal 106. FIG. 12 shows a state just after the vehicle's collision where the deformation of the foot panel 105 is small. FIG. 13 shows a state after the vehicle's collision where the deformation of the foot panel 105 is large. It is generally noted that, at the vehicle's collision, the foot panel 105 tends to be deformed largely on the passenger's toe side rather than the passenger's heel side. Therefore, when the passenger's foot is urged by the foot panel 105, the passenger's ankle is rotated so as to throw the toe back. This rotating angle θ is further increased when the passenger's foot is resting on the pedal 106. All the embodiments of the present invention are constructed so as to restrict such an ankle's rotation owing to the bag's expansion to cover the passenger's heel. Nevertheless, according to this embodiment, since the expansion rate of the bag 104c is large on the passenger's heel side, it is possible to further restrict the rotation of the ankle in comparison with one case without the bag or the other cases of inflating the bag uniformly in the other embodiments. As the amount of gas injected into the bag 104c is increased as the foot panel 105 deforms, it is also possible to reduce the rotating angle of the ankle even if the deformation of the foot panel 105 is large.

FIGS. 14–17 show the fifth embodiment of the present invention. Although the essential constitution of this embodiment is similar to that of the third embodiment, a bag 104d and a reservoir tank 107c are constituted by a continuous container. As similar to the third embodiment, the bag 104d is arranged on the back of the passenger's foot, while the reservoir tank 107c is interposed between a lever of the pedal 106 and the foot panel 105. Accordingly, in the arrangement where the pedal 106 is suspended from the upside, the reservoir tank 107c is positioned higher than the bag 104d. Both of the reservoir tank 107 and the bag 104d are separated from each other through a valve 108 and also adapted so that the liquid charged into the tank 107c does not flow into the bag 104d under a normal pressure. Note, the bag 104d is not always vacant in the initial state and some amount of liquid may be packed in the bag 104d. Since the reservoir tank 107c and the bag 104d are integrated into one body, the arrangement in the vicinity of the foot panel 105 does not occupy the space so much.

Figure 14:
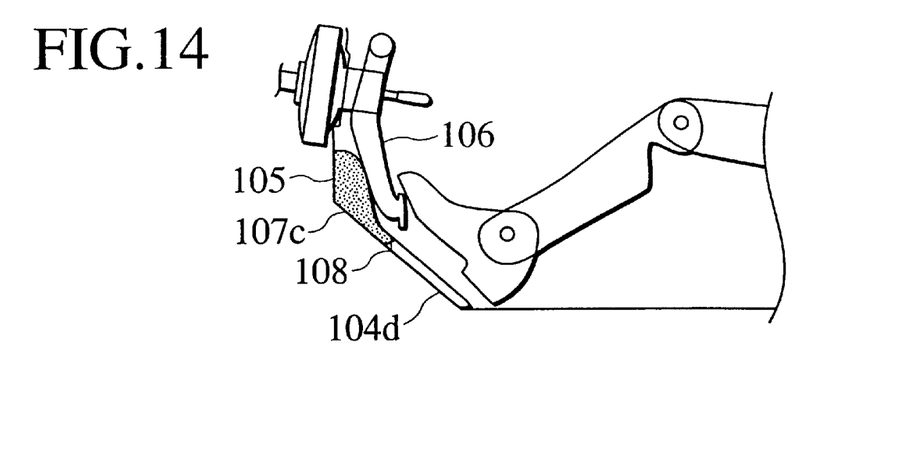
FIG. 14 is a sectional view showing the foot panel before deformation in accordance with the fifth embodiment of the present invention.
Figure 15:
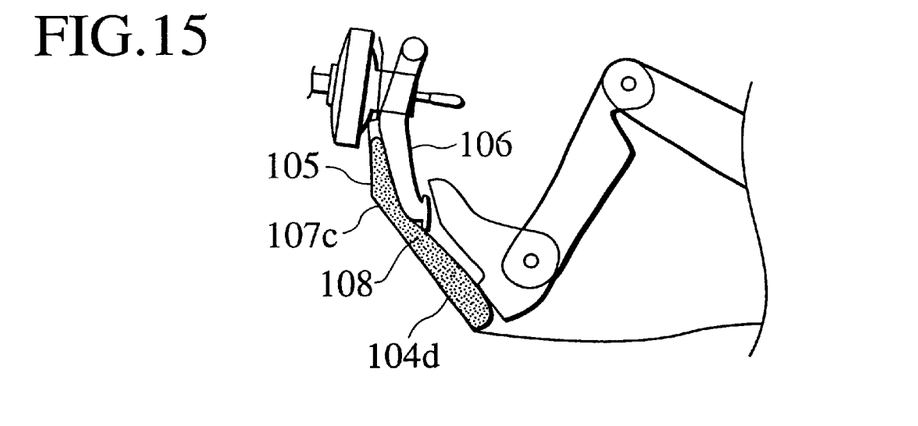
FIG. 15 is a sectional view showing the foot panel being deformed a little in accordance with the fifth embodiment of the present invention.
Figure 16:
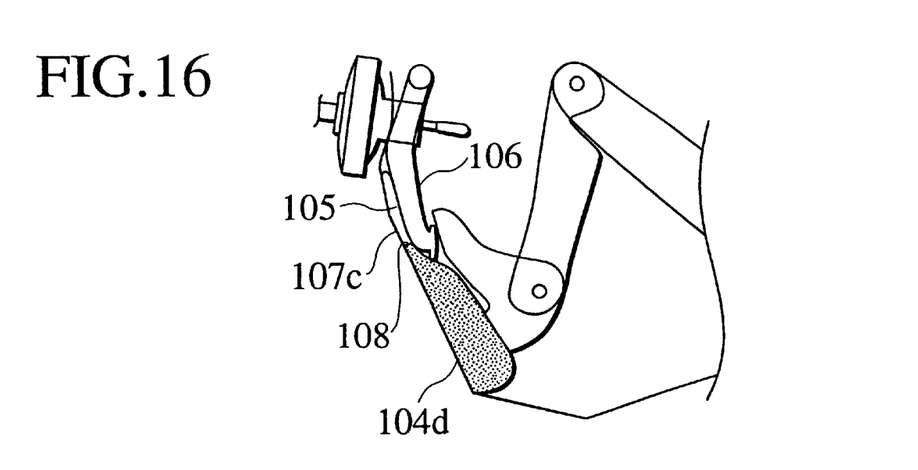
FIG. 16 is a sectional view showing the foot panel being deformed large in accordance with the fifth embodiment of the present invention.

FIG. 14 shows a situation where the frontal passenger is stepping on the pedal 106. FIG. 15 shows a state just after the vehicle's collision where the deformation of the foot panel 105 is small. When the foot panel 105 is deformed at the collision, the reservoir tank 107c is pinched between the foot panel 105 and the lever of the pedal 106 for compression, so that the liquid in the reservoir tank 107c is squeezed out through the valve 108 to expand the bag 104d. FIG. 16 shows a state after the vehicle's collision where the deformation of the foot panel 105 is large. Since the deformed foot panel 105 directly compresses the reservoir tank 107, the expansion rate of the bag 104d is automatically increased. Thus, also in this embodiment, the reservoir tank 107c and the bag 104d of the embodiment serve as "deformation sensor", "controller" and "inflator" of the previous embodiment.

Figure 17:
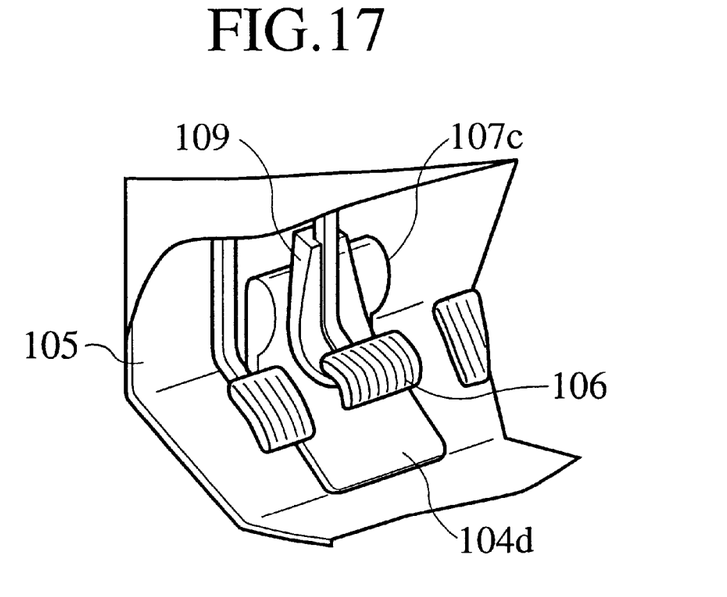
FIG. 17 is a perspective view showing the vicinity of the foot panel in accordance with the fifth embodiment of the present invention.

FIG. 17 is a perspective view of the pedal 106. In order to increase an area of the reservoir tank 107c influenced due to the deformation of the foot panel 105, a bracket 109 is attached to a lever portion of the pedal 106, for increasing the compressed area on the tank 107c. Since the area on the reservoir tank 107c pressed by the bracket 109 becomes wider, the amount of liquid charged into the bag 104d is increased.

Figure 18:
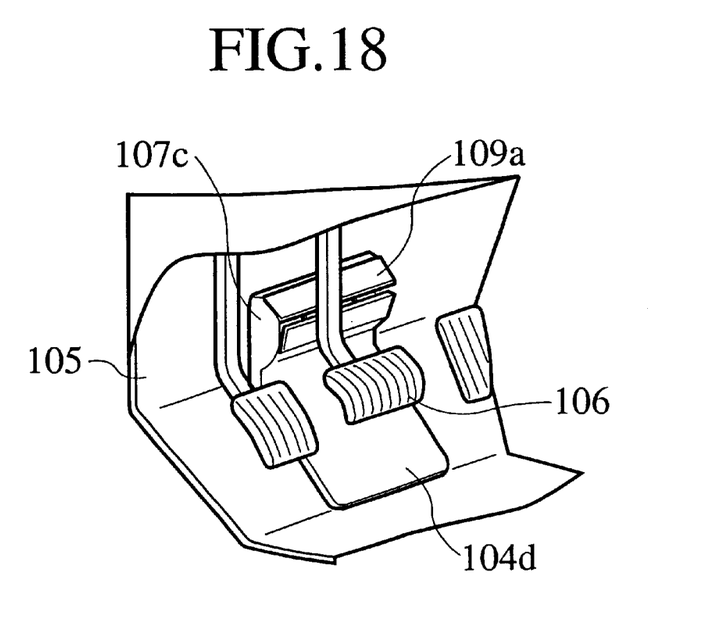
FIG. 18 is a perspective view showing the vicinity of the foot panel in accordance with the sixth embodiment of the present invention.

FIG. 18 is a perspective view of the sixth embodiment. In this embodiment, the reservoir tank 107c is provided with a bracket 109a for increasing the compressed area on the reservoir tank 107c. Corresponding to the contour of the reservoir tank 107c, the bracket 109a is divided into two upper and lower pieces mutually linked through a hinge. When the lever of the pedal 106 presses the bracket 109a, then the hinge is pivoted to be flattened to compress the reservoir tank 107c through a wide area.

Figure 19:
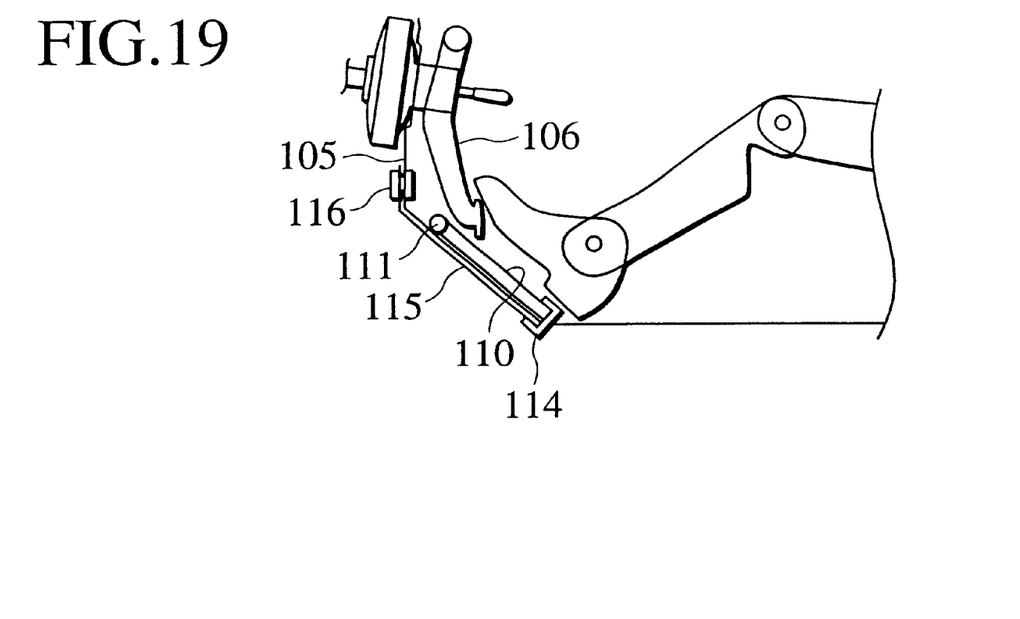
FIG. 19 is a sectional view showing the foot panel before deformation in accordance with the seventh embodiment of the present invention.
Figure 20:
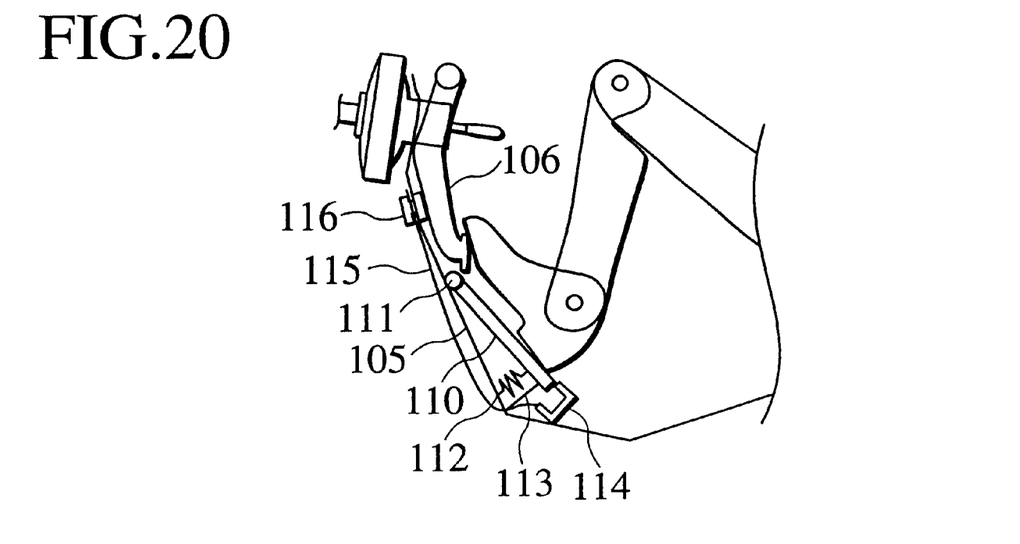
FIG. 20 is a sectional view showing the foot panel after deformation in accordance with the seventh embodiment of the present invention.
Figure 21:
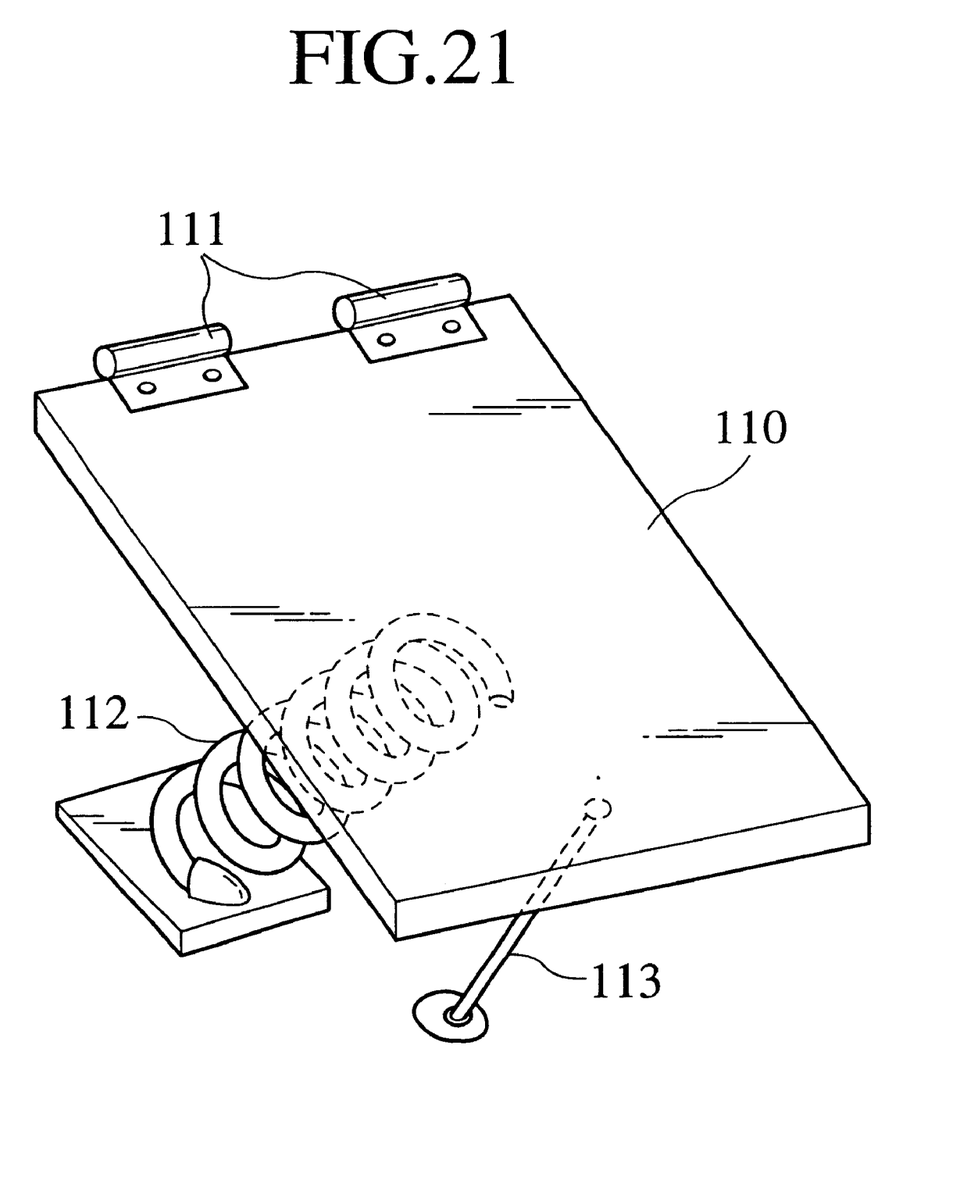
FIG. 21 is a perspective view showing a movable plate in accordance with the seventh embodiment of the present invention.

FIGS. 19–21 show the seventh embodiment. In this embodiment, there is employed a movable plate 110 which projects toward the passenger's foot by a spring 112, in place of the above bag as the shock absorbing element capable of expanding by gas or liquid. The upper end of the movable plate 110 is rotatably attached to the foot panel 105 through a hinge 111. The spring 112 is disposed between the movable plate 110 and the foot panel 105. Therefore, by means of the spring 112, the movable plate 110 is constructed so that its lower portion can project toward the passenger's foot about the hinge 111 as the center. The maximum projecting amount of the movable plate 110 is defined by a stopper 113 in the form of a suspending thread. As the movable plate 110 projects on its lower side, the vicinity of the passenger's heel is urged in comparison with the toe. Therefore, the rotation of the ankle is restricted, as similar to the fourth embodiment.

In the initial state, the movable plate 110 is set to oppose the foot panel 105 while the lowest end is fixed with the panel 105 through a fixing hook 114. Linked to the fixing hook 114 is one end of a wire 115 which has the other end fixed to a latch 116 on the upper part of the foot panel 105. Since the deformation of the foot panel 105 as the result of the vehicle's collision causes the wire 115 to be slackened, the fixing hook 114 is detached from the lower end of the movable plate 110, so that the movable plate 110 projects against the passenger's foot by the spring 112. Accordingly, owing to the provision of the movable plate 110, it is possible to moderate the impact derived from the deformation of the foot panel 105, on the passenger's foot back. Note, the elasticity of the spring 112 employed in this embodiment is less than approx. 50 kN/m. Thus, the spring 112 is established so as not to run out in spite of the panel's deformation of approx. 100 mm while the load on the passenger's foot is not increased excessively. According to the seventh embodiment, owing to its mechanical operation without a fluid, it is possible to save the manufacturing cost.

The entire contents of Japanese Patent Application P10-371302 (filed Dec. 25, 1998) is incorporated herein by reference.

Although the invention has been described above by reference to some embodiments of the invention, the invention is not limited to the embodiments described above.

Modifications and variations of the embodiments described above will occur to those skilled in the art, in light of the above teachings.

The scope of the invention is defined with reference to the following claims.

What is claimed is:

1. A shock absorbing structure for a vehicle comprising:
    a foot panel arranged in the vicinity of a foot pedal of the vehicle and connected to a floor panel of the vehicle, the foot panel forming a part of the vehicle body;
    a bag arranged adjacent to the foot panel;
    an inflator for inflating the bag;
    a sensor for sensing deformation of the foot panel and for transmitting a signal corresponding to deformation of the foot panel due to an impact;
    a control unit for receiving signals from the sensor and activating the inflator;
    wherein a signal transmitted by the sensor corresponding to deformation of the foot panel activates the inflator causing the bag to expand toward a foot of the passenger to moderate impact on the foot.

2. The shock absorbing structure of claim 1, wherein the bag is constructed so that its lower part close to the passenger's heel can expand larger than the upper part close to the passenger's toe, whereby the rotation of the passenger's ankle can be reduced at the foot panel's deforming.

3. The shock absorbing structure of claim 1, wherein the bag is constructed so as to expand by gas.

4. The shock absorbing structure of claim 1, wherein the bag is constructed so that an amount of expansion thereof increases as the amount of deformation of the foot panel becomes larger.

5. The shock absorbing structure of claim 4, wherein the sensor detects the amount of deformation of the foot panel.

6. The shock absorbing structure of claim 4, wherein the sensor detects the amount of deformation of the foot panel and the control unit controls the operation of the inflator in accordance with the detected amount of deformation of the foot panel thereby adjusting the amount of gas being supplied into the bag.

7. The shock absorbing structure of claim 1, wherein the bag is made of flexible material and arranged on the foot panel in a contracted condition.

8. The shock absorbing structure of claim 1, wherein the bag is made of non-flexible material and disposed on the foot panel while the bag is uninflated.

9. An energy absorbing front body structure for a passenger in a cabin of a vehicle comprising:
    a dash panel which separates a front compartment of the vehicle from the cabin, said dash panel being connected to a floor panel on the lower side of the cabin and arranged in the vicinity of a foot pedal of the vehicle;
    an energy absorber attached to the lower side of the dash panel facing in toward the cabin;
    a sensor for sensing deformation of the foot panel and for transmitting a signal corresponding to deformation of the foot panel due to an impact;
    a control unit for receiving signals from the sensor and activating the energy absorber;
    wherein the energy absorber expands toward a foot of the passenger to moderate impact on the foot after receiving a signal transmitted by the sensor corresponding to deformation of the foot panel.

10. The energy absorbing front body structure of claim 9, wherein said energy absorber comprises an airbag.

11. The shock absorbing structure of claim 9, wherein the sensor detects the amount of deformation of the dash panel and the control unit controls the operation of the inflator in accordance with the detected amount of deformation of the dash panel.

12. The energy absorbing front body structure of claim 9, wherein said energy absorber comprises a fluid bag.

13. The energy absorbing front body structure of claim 12, wherein said sensor comprises a pedal hinged to an upper side of the dash panel and facing to the fluid airbag.

14. The energy absorbing front body structure of claim 13, wherein said sensor comprises a bracket attached to a back side of the pedal and facing to the fluid bag.

15. An energy absorbing front body structure for a passenger in a cabin of a vehicle comprising:
    a floor panel which forms a floor of the cabin;
    a dash panel which separates a front compartment of the vehicle from the cabin, the dash panel being connected inclined to the floor panel and arranged in the vicinity of a foot pedal of the vehicle;
    an energy absorber attached to the lower side of the dash panel and facing in toward the cabin;
    an inflator connected to the energy absorber for expanding the energy absorber;
    a sensor for sensing deformation of the dash panel toward the cabin and for transmitting a signal corresponding to deformation of the dash panel due to an impact;
    a control unit for receiving signals from the sensor and activating the energy absorber;
    wherein the energy absorber expands toward a foot of the passenger to moderate impact on the foot after receiving a signal transmitted by the sensor corresponding to deformation of the dash panel.

16. The energy absorbing front body structure of claim 15, wherein said energy absorber comprises an airbag.

17. The energy absorbing front body structure of claim 16, wherein said energy absorber comprises a fluid bag.

* * * * *